United States Patent [19]

Labit et al.

[11] 4,103,710

[45] Aug. 1, 1978

[54] TIME CYCLE CONTROLLER FOR PNEUMATIC VALVE

[75] Inventors: Sidney James Labit, Kenner; Robert Edwin Furmaga, New Orleans, both of La.

[73] Assignee: Baker International Corporation, Orange, Calif.

[21] Appl. No.: 832,720

[22] Filed: Sep. 12, 1977

[51] Int. Cl.$^2$ .............................................. F16K 31/42
[52] U.S. Cl. ........................... 137/624.13; 137/624.18
[58] Field of Search ...................... 137/624.13, 624.15, 137/624.18, 624.2, 102, 624.12

[56] References Cited

U.S. PATENT DOCUMENTS

| 3,267,964 | 8/1966 | Steinmetz | 137/624.13 |
| 3,763,878 | 10/1973 | Harden | 137/624.15 X |

*Primary Examiner*—Alan Cohan
*Attorney, Agent, or Firm*—William C. Norvell, Jr.

[57] ABSTRACT

The invention relates to an economical, reliable time cycle controller for controlling the frequency and duration of the open and close cycles of a valve which may be hydraulically activated, but which is preferably operated by pneumatic means. An electrically actuated pilot valve is employed to control the application of pressurized fluid to the pneumatic main valve. The pilot valve in turn is sequentially controlled by two electrically activated delayed release relays having the characteristic that once energized by a pulse of current, they will hold their contacts in the energized position for a period of time determined by the setting of an adjustable pneumatic timer provided on each relay. A unique circuit connection arrangement between the power source, the variable time delayed release relays, and the two energizing coils of the pilot valve effects the automatic operation of the pilot valve at a frequency determined by the time delayed release setting of one relay and for a duration determined by the timed delayed release setting of the other relay. Additionally, protective devices are provided to insure that the pilot valve will never open the main valve when the battery voltage is insufficient to insure the reclosing of the main valve, and a capacitor is charged whenever the main valve is open to provide an energy pulse sufficient to effect the shifting of the pilot valve to its closing position in event of a power failure or manual disconnection of the power source from the control circuit.

10 Claims, 1 Drawing Figure

TIME CYCLE CONTROLLER FOR PNEUMATIC VALVE

BACKGROUND OF THE INVENTION

There are many applications for fluid operated motor valves which necessitate that the valve be located in a relatively inaccessible area or position. For example, pneumatic motor valves are employed on gas lift wells to periodically inject quantities of gas from a supply source into the well. Serious damage to the well and the motor valve can occur if the motor valve for any reason remains in its open position longer than the desired injection cycle. Because of the remote location of many such wells, it is desirable that the controller for the pneumatically operated main valve be powered by a storage battery, as generally this is the only convenient and reliable source of electric power available. It is therefore essential that the controller operate with a minimum drain of power from the battery so that the battery may operate the controller for many months without requiring a recharge. Equally important is the fact that the controller should not operate to open the gas injection valve at any time that the battery has insufficient power to insure that the subsequent closing cycle will be accomplished. Likewise, whenever inspection of the controller is desired, it is most desirable that upon disconnecting the power source, which in most cases is the storage battery, the controller will be automatically activated to shift the pilot valve to the position where it will effect the closing of the main gas injection valve.

OBJECTS OF THE INVENTION

Accordingly, it is an object of this invention to provide an economical, reliable controller capable of continuous operation over a period of many months which will repeatedly effect preselected open and close cycles of a pneumatically powered main valve for gas injection or other purposes.

A further object of the invention is to provide a battery operated time cycle controller for controlling the open and close cycles of a pneumatically driven valve which will permit both the frequency and the duration of the open condition of the valve to be readily adjusted and then consistently maintained at the adjusted cycle times without operator attention.

A particular object of the invention is to provide a controller for pneumatically powered valves in which the control function is accomplished through the utilization of a two-position pilot valve having separate coils for shifting such valve between its two positions, and two electrically actuated timed delayed release relays which respectively and sequentially effect the energization of the two coils of the pilot valve.

Still another object of the invention is to provide a battery operated time cycle controller for pneumatically driven valves characterized by the provision of a failsafe circuit which will either maintain the valve in its closed position or effect the shifting of the valve to its closed position in the event of either a loss of power in the battery or the opening of the power circuit either intentionally or unintentially while the valve is in its open position.

Other objects and advantages of the invention will become apparent to those skilled in the art in the following detailed description, taken in conjunction with the annexed sheet of drawings.

DESCRIPTION OF PREFERRED EMBODIMENT

Figure 1:
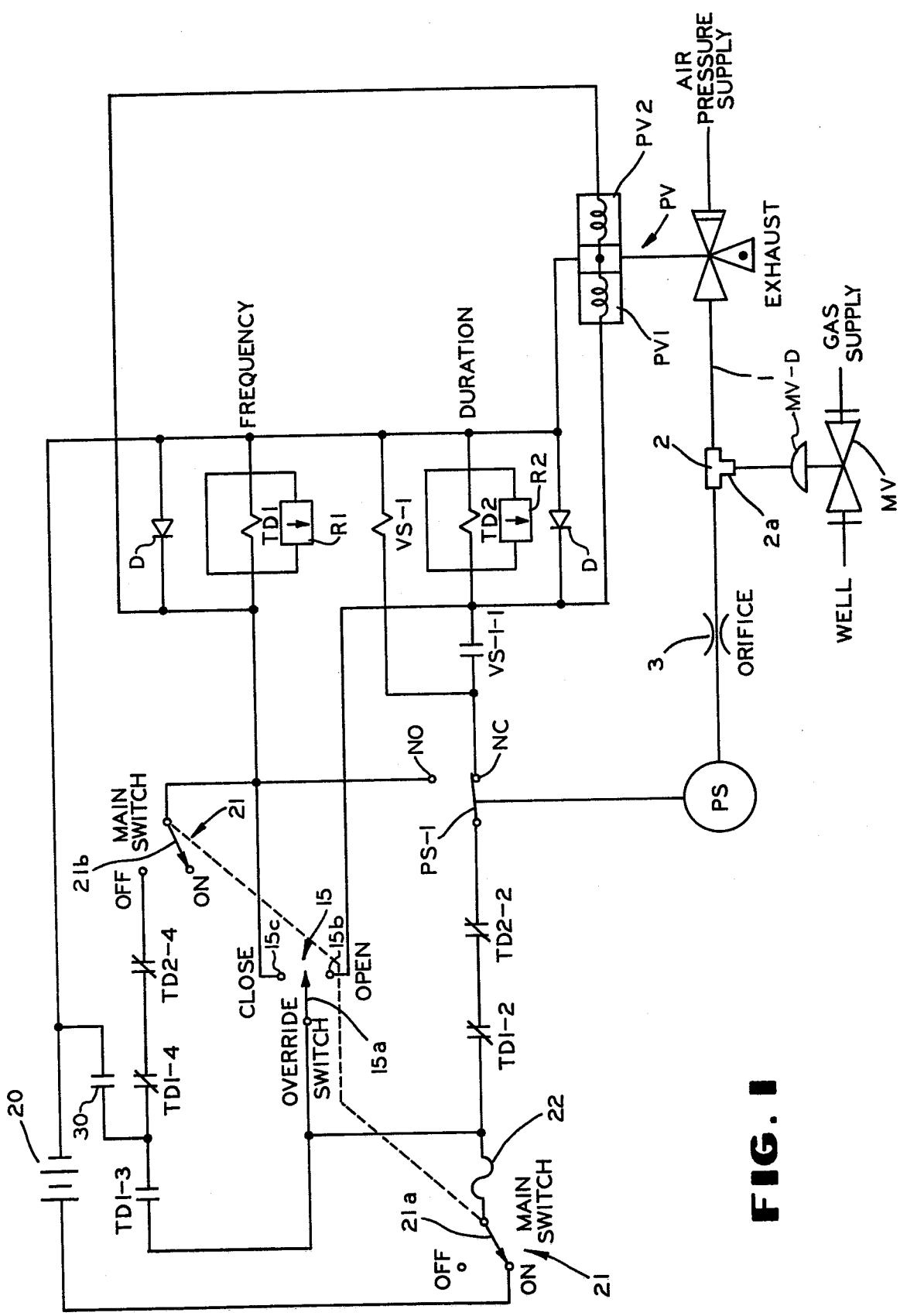
FIG. 1 is a combined electrical and pneumatic schematic diagram of a controller embodying this invention as applied to the control of a pneumatically operated diaphragm valve connected between a gas supply and a well and intermittently operated at a frequency and for a duration determined by the controller circuit to periodically inject gas into the well.

While not limited thereto, the invention will be described in connection with its application to the control of a pneumatically operated, diaphragm-type main valve MV which is disposed between a gas supply and a well and is controlled by the apparatus embodying this invention to periodically inject gas into the well at a frequency and for a duration respectively determined by the settings of two adjustable time delayed release relays TD1 and TD2.

The pneumatic operation of the diaphragm-type main valve MV is accomplished by the intermittent operation of a pilot valve PV which is connected between a presurized air supply (not shown) and a conduit 1 connected to a tee coupling 2 having the stem 2a thereof connected to the diaphragm MV-D of the main valve MV. Pilot valve PV is a commonly known type having two electrical energizing coils or motors PV1 and PV2 which respectively shift the pilot valve PV between its two positions. In the one position, hereinafter called the "open" position, the air supply is connected directly to the conduit 1, thus applying pressured fluid to the diaphragm MV-D of the main valve MV to cause such main valve to open. In the other (closed) position of pilot valve PV, the conduit 1 leading to the tee connection 2 is connected to an exhaust port, as shown in FIG. 1, and any pressure on the diaphragm MV-D of the main valve MV is permitted to dissipate through the exhaust port of PV and the main valve will accordingly close and remain closed.

The other side of the tee connection 2 is connected to an orifice 3 and the output of orifice 3 in turn is pneumatically connected to a pressure switch PS. The pressure switch PS is adjusted to be actuated whenever sufficient pressure is applied to the diaphragm valve of main valve MV to cause same to move to its open position. Hence, the pressure switch PS is actuated to shift its switching pole PS1 from contact terminal NC (normally closed) to contact terminal NO (normally open) in the electrical circuit.

The variable time delayed release relays TD1 and TD2 may be any of several commercially available types having the characteristic that when energized by a voltage pulse of limited duration, the contacts of the relay are shifted to their energized position and remain there by application of a pneumatic pressure for a time period respectively determined by the settings of a pneumatic timer R1 and R2 respectively. Each relay has a diode D connected in parallel with its relay coil to reduce arcing across the various relay and switch contacts. Because such relays are conventional, they have been shown only schematically. In the controller circuit to be described, the variable time delayed release relay TD1 is utilized to control the frequency of application of energizing pulses to pilot valve PV, while the variable time delayed release relay TD2 is utilized to control the duration that the pilot valve PV is held in its open position and hence effects the closing of the pilot valve PV whenever the contacts of relay TD2 have remained in their energized position for the selected time period. In a typical application of the controller of this invention to the control of gas injection into a well, the frequency timer TD1 would have a selective time delay range of 6 to 60 minutes while the duration timer TD2 would have a range of zero to three hundred seconds. The selection of the delay time ranges of the relays is purely a matter of choice and is not to be considered as a limitation upon this invention.

Because gas injection controllers are often located in remote areas where reliable commercial power is not readily available, the controller has been designed to operate from a conventional storage battery. Preferably, two standard twelve volt batteries are connected in series to provide a twenty-four volt continuous power source 20. The power source 20 is connected through one pole 21a of a two pole main switch 21 to a fuse 22, and then through the serially connected, normally closed contacts TD1-2 and TD2-2 of the time delayed release relays TD1 and TD2 to the single pole PS-1 of the pressure switch PS. The one terminal NC of pressure switch PS, corresponding to no pressure being applied to the diaphragm of main valve MV, is connected to the energizing coil of a voltage responsive relay VS1. Contacts VS1-1 of the voltage responsive relay VS1 are serially connected with the energizing coil of the duration relay TD2, which in turn is connected in parallel with the energizing or "open" coil PV1 of the pilot valve PV. The voltage sensing relay VS1 is of the type that will not actuate unless the applied voltage exceeds a prescribed minimum value. In the case of a twenty-four volt battery power source, the relay VS1 can be selected to operate at a given voltage. This insures that the controller circuit will not operate to open the main valve MV if the battery 20 has been discharged to the extent that its voltage is reduced below the given voltage.

The energization of voltage sensitive relay VS1 causes the closing of the normally open contacts VS1-1 and permits a pulse of electric energy to be applied concurrently to the coil of duration relay TD2 and the "open" coil PV1 of the pilot valve PV. All contacts of the duration relay TD2, including contacts TD2-2 which are serially connected to the power supply for relay TD2, are then moved to their energized position and hence only a pulse of electrical energy is applied to duration relay TD2 and to coil PV1 of pilot valve PV. Such pulse, however, is of sufficient duration to cause the relay TD2 to assume its energized position in which it will maintain for a period of time determined by the setting of the pneumatic timer R2. Similarly, the energy pulse supplied to coil PV of pilot valve PV is sufficient to cause the actuation of the pilot valve to its open position wherein the pressurized air supply is connected through the tee 2 to both the diaphragm MV-D of the main valve MV and to the pressure switch PS. Hence, the main valve MV opens and gas will begin to flow from the supply into the well and will continue until the deenergizing or "close" coil PV2 of pilot valve PV is energized to return the pilot valve to its other position wherein the diaphragm MV-D of main valve MV is connected to exhaust and no pressure is applied to the pressure switch PS.

While the duration relay TD2 and the "open" coil PV1 are shown as being connected in parallel for concurrent energization by the 24 volt source, they could be connected in series if capable of operation at twelve volts. Concurrent operation in response to a voltage pulse is the necessary condition.

The actuation of the pressure switch PS causes its single pole PS-1 to move from contact NC to contact NO. This effectively connects the energizing coil of the frequency relay TD1 to the power source 20 whenever relay TD2 completes its pre-set time delay and returns its contacts to their de-energized positions, thus closing contact TD2-2. Since the "close" coil PV2 of pilot valve PV is connected in parallel with the frequency relay TD1, it will likewise receive an energization pulse upon the time delayed closing of contacts TD2-2. The same comments with respect to the choice of series or parallel connection of relay TD1 and close coil PV2 apply here as discussed above in connection with relay TD2 and coil PV-1. Concurrent energization by a voltage pulse is the necessary condition.

The energization of relay TD1 by a pulse of energy effects the opening of contacts TD1-2 and hence permits only an energy pulse of limited duration to be applied to the "close" coil PV2 of pilot valve PV; however, this pulse is of sufficient duration to cause the pilot valve to be shifted to its other position wherein the conduit 1 is connected to exhaust and hence the diaphragm MV-D of main valve MV operates to close the main valve MV. At the same time, pressure switch PS operates to return its single pole PS1 into engagement with contacts NC.

The main valve MV will thus remain in the closed position until the frequency relay TD1 completes its pre-set time delay as determined by the pneumatic timer R1, whereupon all contacts of relay TD1 return to their de-energized position illustrated in the drawing. Thus, contacts TD1-2 are closed and the energization circuit for relay TD2 and energizing coil PV1 of pilot valve PV are again completed, permitting repetition of the previously described cycle of operations.

In summary, the frequency of operation of main valve MV is determined by the setting of the time delayed release relay TD1, while the duration that the main valve MV remains in its open position is determined by the setting of the time delayed release relay TD2. The pressure switch PS effectively accomplishes the switching of the control from one relay to the other through moving its single pole PS1 from contact NC to contact NO and then back to its starting position.

While the apparatus heretofore described performs the basic function of controlling the frequency of operation of the pneumatically operated main valve MV and the duration of its positioning in the open position, several additional desirable features providing failsafe and manual override capabilities may be conveniently incorporated in the aforedescribed arrangement. For example, it is desirable that if the main switch 21 be turned to its off position while the main valve MV is open, the controller should react to effect the closing of the main valve MV irrespective of the fact that the controller has been disconnected from its normal power source.

This failsafe feature is accomplished through the connection of a capacitor 30 between one side of power source 20, then through the contacts TD1-3 of frequency relay TD1 to the circuit side of the fuse 22. Thus, each time that the frequency controlling relay TD1 is energized, the capacitor 30 is charged to the voltage of the power source 20. Capacitor 30 is provided with sufficient capacitance to insure that the stored charge will have enough energy to effect the energization of the "close" coil PV2 of pilot valve PV.

The charge on capacitor 30 is applied to "close" coil PV2 through the normally closed contacts TD1-4 and TD2-4 and the second pole 21b of main switch 21 when the main switch 21 is shifted to its Off position. Contacts TD1-4 and TD2-4 will be in their closed position only if both the frequency controlling relay TD1 and the duration controlling relay TD2 have completed their prescribed delayed return cycles which means that it is the proper time for the main valve MV to be closed. The discharge of capacitor 30 through the "close" coil PV2 of pilot valve PV shifts valve PV to its closed position and removes the pressure from the diaphragm MV-D of main valve MV and thus permits such valve to be pneumatically shifted to its closed position.

The failsafe feature of the voltage sensitive relay VS1 has already been described and insures that the main valve MV will not be operated to its open position if the voltage source 20 has insufficient voltage to insure that the main valve can be returned by the controller to its closed position.

There may be occasions when it is desired to override the control system, in other words, if the controller is in the condition wherein the main valve MV is closed and the frequency relay TD1 has not completed its time delay cycle, it may for some reason be desirable to manually open the main valve MV. This may be accomplished by actuating an override switch 15, which is a conventional three position, spring centered, toggle switch having a moveable blade 15a cooperating with either an open contact 15b or a closed contact 15c. Manually shifting blade 15a to the open contact 15b effects the direct energization of the energizing coil PV1 of the pilot valve PV to shift said valve to its "open" position to apply pressured fluid to the diaphragm MV-D of main valve MV. Similarly, if it is desired to close main valve MV at a time in the cycle when it is normally open, manually shifting of the blade 15a of the override switch 15 into engagement with contact 15c effects the direct energization of the "close" coil PV2 of the pilot valve PV which removes the pressured air supply from the diaphragm MV-D of main valve MV, causing such valve to close.

One important feature of the aforedescribed controlling apparatus lies in the fact that the substantial power required to effect the opening of the main supply valve is supplied by the pressurized air supply. Since the frequency relay TD1, the duration relay TD2 and the pilot valve PV are all operable by a short duration electrical pulse, the power consumption by these units is minimal, thereby insuring that when a battery is employed as the power source 20, it will be effective over a period of many months before requiring recharging.

Although the invention has been described in terms of specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without department from the spirit of the described invention.

What is claimed and desired to be secured by Letters Patent is:

1. A controller for providing timed cycles of operation of a main valve actuated from a source of fluid pressure, comprising: a source of electric power; an electrically actuated pilot valve connected between the fluid pressure source and the main valve, said pilot valve being responsive to first and second electric pulses respectively for moving said pilot valve to its open and closed positions; relay means responsive to said first and second electrical pulses respectively for maintaining a first plurality of relay contacts in their energized positions for a first predetermined time period and a second plurality of relay contacts in their energized positions for a second pre-determined time period; a single pole pressure switch movable between two contacts in response to the application of the fluid pressure to the main valve; and means connecting a pair of normally closed contacts of each of said first and second pluralities of relay contacts in series between said power source and the single pole of said pressure switch and connecting said two pressure switch contacts to said relay means and said pilot valve whereby said first electrical pulses are generated when said normally closed contacts are closed and said pressure switch is moved to one of said two contacts and said second electrical pulses are generated when said normally closed contacts are closed and said pressure switch is moved to the other one of said two contacts, said first predetermined time period determining the duration of the opening of said pilot valve and said second pre-determined time period determining the frequency of generation of said first and second electrical pulses and the opening of said pilot valve.

2. A controller for providing timed cycles of operation of a fluid pressure actuated main valve, comprising: a continuous electric power source; an electrically actuated pilot valve constructed and arranged to control the flow of pressurized fluid to said main valve, said pilot valve having two energizing coils respectively moving said pilot valve to its open and closed positions upon energization by a pulse of electric energy, one side of each of said energizing coils connected to one side of said power source; a pair of relays of the type that, when energized by a voltage pulse, maintains its contacts in their energized positions for a pre-selected time delayed period, each of said relays having a pair of energization terminals respectively connected in parallel with said energizing coils of said pilot valve; means for continuously connecting the other side of each of said energizing coils and one of said relay energization terminals of each of said pairs to one side of said electric power source; a single pole pressure switch moveable between either of two contact positions in response of the application of pressurized fluid to said main valve; means for respectively connecting the two contacts of said pressure switch to the other one of said relay energization terminals of each of said pairs; and means for serially connecting the single pole of said pressure switch to the other side of said power source through a serially connected pair of contacts of each of said relays whereby the sequential operation of said pressure switch effects the successive energization of each said relay and its parallel connected said energizing coil of said pilot valve by a short duration pulse, thereby premitting the frequency and duration of opening of said main valve to be determined by the pre-selected time delayed release settings of said pair of relays.

3. The controller defined in claim 1 including a voltage sensing relay connected across said electric power source, said relay having a pair of contacts that open whenever the voltage of said power source drops a predetermined amount, said contacts being serially connected in the power applying circuit for the one said energizing coil that effects the movement of the pilot valve to its open position thereby preventing the opening of the main valve whenever a predetermined drop in voltage of said power source is encountered.

4. The controller defined in claim 1 wherein said pilot valve is operable by a short duration pulse of applied voltage and each of said relays is energizable by a voltage pulse of similar short duration.

5. The controller defined in claim 1 including a capacitor of sufficient capacitance to store a charge capable of operating said pilot valve to its closed position and circuit means connecting said capacitor to said power source for charging same when said pilot valve is in its said open position and for operating said pilot valve to close same when said power source is disconnected from the circuit.

6. The controller defined in claim 1 including a three position manual override switch, one of said positions being a neutral position, and circuit means respectively connecting said other two switch positions to directly energize said energizing coils of said pilot valve.

7. A control apparatus for effecting continuously repeated timed movements of a valve in a pneumatic system from an "off" position wherein no pneumatic fluid pressure is applied to the system through the valve to an "on" position wherein pneumatic fluid pressure is applied to the system through the valve, said valve having a pair of electrically powered actuators responsive to a short duration pulse of applied voltage to respectively shift the valve to its said "off" and "on" positions, comprising: a pair of relays of the type that when energized by a voltage pulse maintains its contacts in their energized position for a pre-selected time period; a pressure switch adapted for connection in the pneumatic system and having a single pole switch moveable between a normally open contact to a normally closed contact and back in response to the application of pneumatic pressure to the system or termination of pressure in the system respectively; an electrical power source; circuit means interconnecting one valve actuator and one of said relays for concurrent energization by said power source through the normally closed contacts of said pressure switch and interconnecting said other valve actuator and said other relay for concurrent energization by said power source through the normally open contacts of said pressure switch, said circuit means including a pair of normally closed contacts of each said relays connected in series between said power source and said single pole of said pressure switch, whereby pulses of voltage are sequentially applied to said valve actuators to shift the valve to its "on" position at a frequency controlled by the delayed release setting of one of said relays and for a duration controlled by the delayed release setting of said other relay.

8. The control apparatus of claim 7 including a voltage sensing relay connected across said electric power source, said relay having a pair of contacts that open whenever the voltage of said source drops a pre-determined amount, said contacts being serially connected in the power applying circuit for the one valve actuator that effects the movement of the valve to its "on" position.

9. The control apparatus of claim 8 including a capacitor of sufficient capacitance to store a charge capable of actuating said valve to its "off" position and circuit means connecting said capacitor to said power source for charging said capacitor when said valve is in its "on" position and for operating said valve to its "off" position when said power source is disconnected from the circuit.

10. The control apparatus defined in claim 7 including a three position, manual override switch, one of said positions being a neutral position, and circuit means respectively connecting said other two switch positions to directly energize said valve actuators from said power sources.

* * * * *